US007009719B2

(12) United States Patent
Willis et al.

(10) Patent No.: US 7,009,719 B2
(45) Date of Patent: Mar. 7, 2006

(54) SYSTEMS AND METHODS FOR CONTROLLING AN IMAGE FORMING SYSTEM BASED ON CUSTOMER REPLACEABLE UNIT STATUS

(75) Inventors: Keith L. Willis, Rochester, NY (US); Thomas Myers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 974 days.

(21) Appl. No.: 09/683,054

(22) Filed: Nov. 13, 2001

(65) Prior Publication Data

US 2003/0090696 A1 May 15, 2003

(51) Int. Cl.
*G06F 13/00* (2006.01)
*G06F 15/00* (2006.01)

(52) U.S. Cl. ........................ 358/1.1; 358/1.15; 399/24; 399/25; 399/26; 399/27; 399/28; 399/29; 399/30; 399/82; 399/83; 399/85; 399/87

(58) Field of Classification Search ................ 358/1.1, 358/1.15; 399/24–30, 82, 83, 85, 87
See application file for complete search history.

(56) References Cited

U.S. PATENT DOCUMENTS

| | | | | |
|---|---|---|---|---|
| 4,627,715 | A | 12/1986 | Kikuno | 399/43 |
| 5,859,711 | A * | 1/1999 | Barry et al. | 358/296 |
| 6,266,493 | B1 | 7/2001 | Farrell et al. | 399/24 |
| 6,275,664 | B1 | 8/2001 | Wolf et al. | 399/8 |
| 6,366,744 | B1 * | 4/2002 | Phillips et al. | 399/24 |
| 6,471,314 | B1 * | 10/2002 | Doi | 347/5 |
| 2003/0067618 | A1 * | 4/2003 | Farrell et al. | 358/1.12 |

FOREIGN PATENT DOCUMENTS

| | | |
|---|---|---|
| EP | 0 620 503 A2 | 10/1994 |
| EP | 0 878 747 A2 | 11/1998 |
| EP | 0 962 854 A2 | 12/1999 |

* cited by examiner

*Primary Examiner*—Edward Coles
*Assistant Examiner*—Alan Rahimi
(74) *Attorney, Agent, or Firm*—Oliff & Berridge, PLC

(57) ABSTRACT

Informing the user when consumables and/or customer replaceable units will have to be resupplied, changed and/or replaced, relative to the jobs sent to the image forming system, is a beneficial way to avoid unnecessary printing delays. When a job is added to a job queue or repositioned within the job queue, a warning can be associated with that job, and displayed to the user. With this information, the user can pre-emptively add a consumable and/or to replace a customer replaceable unit to avoid delays and maintain productivity. Alternatively, if such a system fault would occur prior to an urgent job reaching the top of the job queue, the user can manipulate the order and/or presence of the various jobs in the queue to ensure the high-priority job is completed before the consumable is fully exhausted and/or the customer replaceable unit reaches the end of its useful life.

22 Claims, 9 Drawing Sheets

SYSTEMS AND METHODS FOR CONTROLLING AN IMAGE FORMING SYSTEM BASED ON CUSTOMER REPLACEABLE UNIT STATUS

BACKGROUND OF THE INVENTION

1. Field of Invention

This invention is directed to an image forming system that has limited amounts of consumable materials and/or that uses customer replaceable units.

2. Description of Related Art

Printers, copiers and other types of image forming systems have become ubiquitous office productivity tools for generating tangible copies of original documents and/or electronic documents. Under normal circumstances, a user would send a print request to the image forming system and then retrieve the formed image.

Invariably, problems arise when making copies on a recording medium. Problems such as lack of the recording media, depleted toner supplies, consumption of the useful life of customer replaceable units (CRU's), and/or malfunctions of the customer replaceable units due to old or broken parts, result in lower productivity and additional cost to the user and/or customer.

The above-described problems that arise during image production are usually discovered when the user attempts to retrieve the printed documents. However, at this time, the user was unaware that the printing of the documents did not take place. Thus, the user will have to conduct troubleshooting at the image forming system. If the user has requested multiple portions of different documents, the user will have to determine which jobs have been completed and which jobs have not been completed. If there is a job which is of a higher priority and that the user needs urgently, printing of the document corresponding to this job will be delayed until the problem is fixed and all other documents are printed that were sent to the image forming system before the urgent document. This could result in costly delays to the user.

SUMMARY OF THE INVENTION

The replacement of a consumable of a image forming system is common with all image forming systems. However, the delays associated with document printing due to replacement of consumables can be avoided.

Informing the user with an early status of when consumables and/or customer replaceable units will have to be resupplied, changed and/or replaced, relative to the jobs sent to the image forming system, is a beneficial way to avoid the problems discussed above. With this information provided to the user in advance of a system fault occurring due to a consumable becoming exhausted or a customer replaceable unit reaching the end of its useful life, the user is provided with an early opportunity to add a consumable and/or to replace a customer replaceable unit to avoid delays and maintain productivity. Alternatively, if the user was aware that such a system fault would occur prior to an urgent job reaching the top of a queue, the user could manipulate the order and/or presence of the various jobs in the queue to ensure the high-priority job is completed before the consumable is fully exhausted and/or the customer replaceable unit reaches the end of its useful life.

This invention provides systems and methods for notifying a user when a consumable is likely to be exhausted.

This invention separately provides systems and methods for notifying a user when a customer replaceable unit is likely to reach the end of its useful life.

This invention separately provides systems and methods to enable a user to efficiently manage the production of documents in view of one or more consumables in the image forming system during image production becoming depleted.

This invention separately provides systems and methods that identify the status of consumables and/or customer replaceable units in an image forming system relative to the jobs assigned to that image forming system.

In various exemplary embodiments, the systems and methods of this invention use sensors to determine the useable amount of an image production supply material that remains available to the image forming system to form images.

In various other exemplary embodiments, the image forming system's controller can determine whether this image forming system will be able to complete a particular image job based on the status of the various consumables and/or customer replaceable units.

In various other exemplary embodiments, the image forming system can determine whether it is able to complete the job based on available supplies of consumables, remaining useful life of customer replaceable units and/or requirements of that job identification portion. If the job is not able to be completed, the image forming system alerts the user that the job cannot be completed. This allows the image forming system, such as a printer, to warn the user when image production supplies are going to run out and/or when a customer replaceable unit will reach the end of its useful life.

In various exemplary embodiments, the user can promote a job within a job queue to allow that job to be completed ahead of an earlier-scheduled job. Alternatively, a job can be demoted behind other jobs the user deems more important to complete. Therefore, the image forming system allows particular jobs to be advanced in the job queue so that image production efficiency may be improved.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail with reference to the following figures, wherein.

DETAILED DESCRIPTION OF PREFERRED EMBODIMENTS

Figure 1:
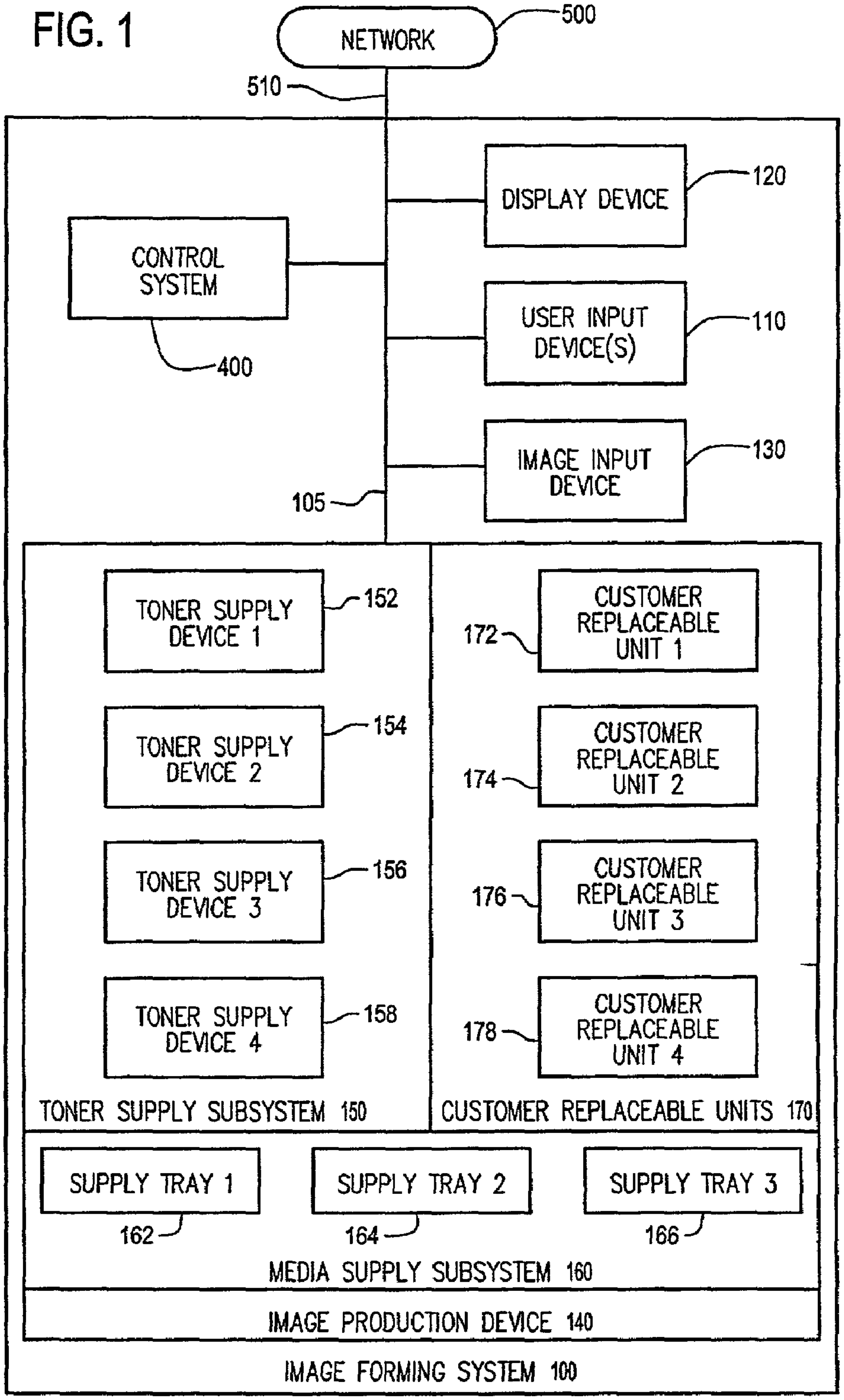
FIG. 1 shows an exemplary embodiment of an image forming system.

FIG. 1 shows an exemplary embodiment of an image forming system 100 according to the invention. As shown in FIG. 1, the image forming system 100 includes an image control system 400, one or more user input devices 110, a display device 120, an image input device 130, and an image production device 140. The image forming device 100 is also connected to a network 500 over a link 510. The image production device 140 contains a toner supply subsystem 150, a media supply subsystem 160 and a number of customer replaceable units 170. The toner supply subsystem 150 includes any desired number of individual toner supply devices, such as the first-fourth toner supply devices 152, 154, 156 and 158, respectively shown in FIG. 1. Each toner supply device 152–158 contains a limited amount of a distinct type (color, composition and/or the like) of toner that is gradually consumed as the image forming system 100 forms images on recording sheets according to various jobs. Each toner supply device 152–158 also includes a sensor useable to determine an amount of toner remaining in that toner supply device.

The user input devices 110 can be one or more of any known or later-developed input device usable by the user to input data and/or commands to the image forming device. It should also be appreciated that one or more of the one or more user input devices can be combined with the display device, such as in a touch-screen. The image input device 130 can be any known or later-developed device usable to input image data for a job, such as a scanner. It should also be appreciated that, in various exemplary embodiments, the image input device 130 can be omitted from the image forming system 100.

The control system 400 receives jobs from the user, either over the network 500 or using the image input device 130. Each job indicates such things as the particular document, file or image to be formed and the number of copies to be formed. The control system 400 analyzes the job to determine what different types of toner will be needed, such as black toner for black and white character images or colors such as cyan, magenta, yellow and black for color picture images, and how much of each different type of toner.

The control system 400 also receives information from the image production device 140. As indicated above, various sensors provided in the image production device 140 can be used indicate the useable amount of toner in the toner supply units 152, 154, 156 and 158, the amount of recording medium remaining in each of the supply trays 162, 164 and 166, and the status of each of the customer replaceable units 172, 174, 176 and 178. This information is provided to the control system 400.

In various exemplary embodiments, the control system 400 can determine the useable amount of toner in the toner supply units 152, 154, 156 and 158, the amount of recording medium remaining in each of the supply trays 162, 164 and 166, and the status of each of the customer replaceable units 172, 174, 176 and 178 by calculating the difference between the available amount of that consumable, the amount of useful life of that customer replaceable unit and the amount of that consumable or the amount of that useful life that has already been consumed, respectively.

In various other exemplary embodiments according to this invention, a user can enter the initial available amount of a consumable or, the amount of useful life into the controller 400 when a consumable or a customer replaceable unit, respectively, will be used with the image forming system 100. The user can enter this information, which is generally provided with the consumable or customer replaceable unit. Alternatively, the controller 400 can also determine the initial available amount of the consumable or useful life of a customer replaceable unit by sensing the information provided with that consumable or that customer replaceable unit, respectively.

The control system 400 determines whether the toner supply units 152, 154, 156 and/or 158, the supply trays 162, 164 and/or 166, and/or the customer replaceable units 172, 174, 176 and/or 178 contain adequate amounts of toner, image recording media and/or useful life, respectively, to complete a particular job. If all of the toner supply devices 152–158 that will be used for that job and all of the supply trays 162–166 that will be used for that job contain consumable material sufficient to complete that job, and all of the consumer replaceable units 170 that will be used for that job have sufficient remaining useful life to complete that job, then that job proceeds as requested.

However, if the control system 400 determines that one or more of the consumer replaceable units 170 that will be used for that job does not have enough useful life left, and/or the amount of recording media remaining in one or more of the supply trays 162, 164 and 166 that will be used for that job and/or the amount of toner in one or more of the toner supply devices 152–158 that will be used for that job is inadequate to complete that job, the control system 400 will generate a warning message to alert the user that that requested job cannot be currently completed.

For example, the control system 400 can display a warning message or alert on the display device 120 relative to a job identification portion of a displayed image, such as a graphical user interface, that corresponds to that job. The warning message or alert can be any method of alerting the user, such as a warning icon, a flashing light and/or an audible noise. Any other known or later-developed warning techniques or methods are possible without departing from the spirit and scope of this invention.

Figure 2:
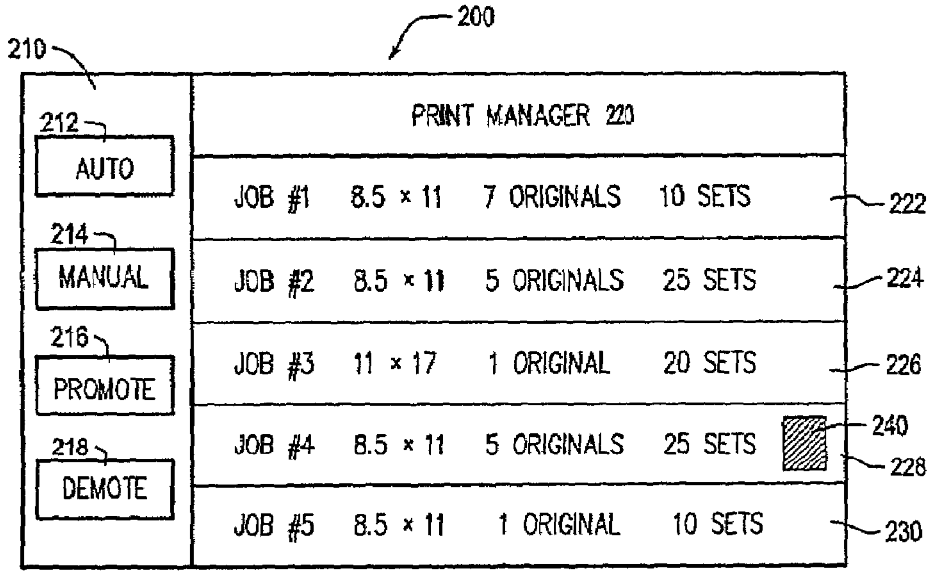
FIG. 2 shows an exemplary user interface according to this invention.

FIG. 2 shows an exemplary embodiment of a user interface 200 according to this invention that is displayable on the display device 120. The exemplary user interface 200 may also be displayed on a display device of a remotely located computer connectable to the image forming system 100 over the network 500. The user interface 200 includes a tool bar 210 and a title bar 220. The user interface 200 includes a plurality of job identification portions 222, 224, 226, 228 and 230. The tool bar 210 can also include one or more of a demote button 218, a promote button 216, a manual button 214 and an auto button 212.

Each job identification portion 222–230 corresponds to, and can indicate information about, one of the jobs that are present in a job queue of the control system 400. In various exemplary embodiments, as shown in FIG. 2, each job identification portion 222–230 indicates the size of the recording media to be used for the corresponding job, the number of original pages in the document of that job, and/or the number of copies to be made for that job. It should also be appreciated that, in various exemplary embodiments, the job identification portions 222–230 can provide other information to aid the user.

In various exemplary embodiments according to this invention, a warning message or alert icon 240 can be displayed in none, any one or more, or all, of the job indication portions 222–230. Each warning message or alert icon 240 indicates one or more potential system faults regarding one or more of the toner supply devices 152–158, one or more of the supply trays 162–166 and/or one or more of the customer replaceable units 172–178 that are expected to occur before the job corresponding to the job identification portion, with which that warning message or alert icon 240 is associated, can be completed.

Thus, a warning message or alert icon 240 will appear in the user interface 200 to indicate a particular job identification portion where, for example, it is expected that one or more of the toner supply devices 152, 154, 156 and 158 will need refilling to complete the corresponding job. After the warning message or alert 240 icon appears, the user can move a selection device or the like relative to that warning message or alert 240 to hover over or otherwise activate that warning message or alert icon 240. This allows the user to determine the specific reason for the alert status. For example, a message displayed in response to hovering over the warning message or alert icon 240 displayed relative to the job identification portion 228 could indicate that "cyan toner needs to be added" to complete the job associated with that job identification portion 228.

Figure 3:
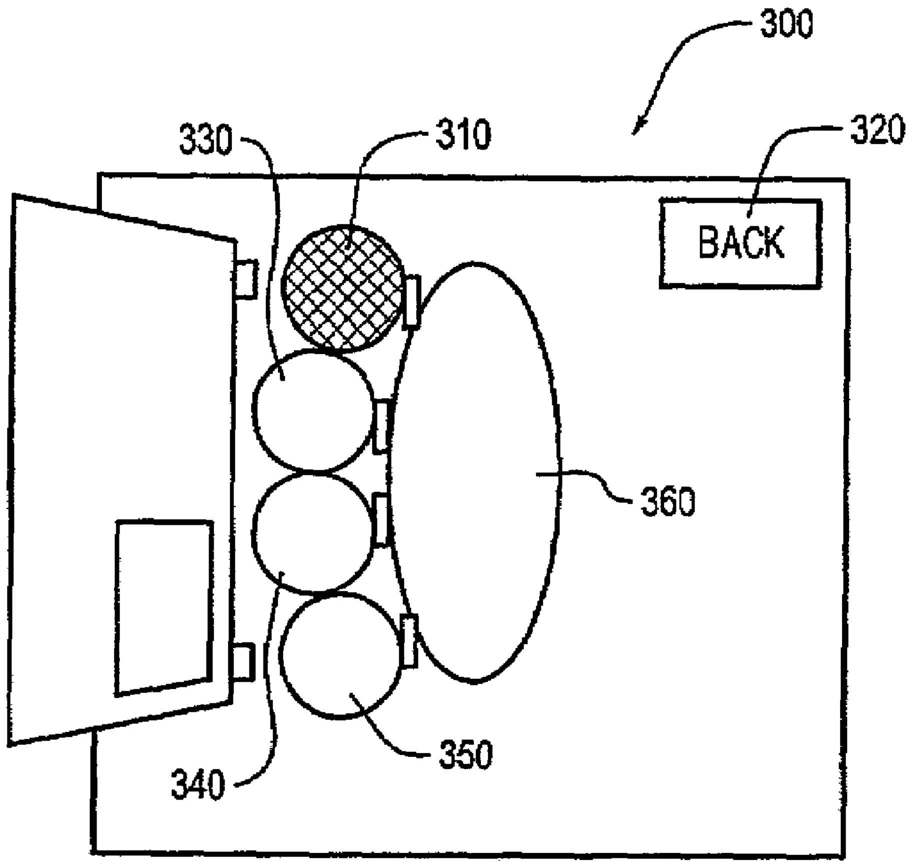
FIG. 3 shows an exemplary user interface showing an internal mechanical view of the image forming system of FIG. 1.

As shown in FIG. 3, in response to selecting a particular warning message or alert icon 240, a full screen image of the area that requires user interaction can be displayed to the user or the display device 120.

Additional warning messages or alert icons 240 can be displayed in the job identification portion 228 or any of the other job identification portions 222–226 and 230 to indicate other actions that need to be performed by the user. That is, two or more warning messages or alert icons 240 could be displayed in the same job identification portion if, for example, two different consumables would be exhausted before the job corresponding to that job identification portion could be completed. For example, a second warning message or alert icon 240 could be displayed on the user interface 200 to indicate that in order to complete a different job, refilling of one of the trays 160, 162 or 164 with a recording medium will need to be performed. Similarly, a third warning message or alert icon 240 can be displayed to warn the user that one of the customer replaceable units 272–278 needs to be replaced.

The warning message or alert icon 240 shows the user when a problem is expected to arise in view of the sequence of jobs scheduled in the job queue. This sequence of jobs in the job queue is reflected by the order of the corresponding job identification portions displayed in the user interface 200. Thus, a user can know that the image forming system will require maintenance during a particular job. As a result, the user also knows that any subsequent job after that job, that also requires the consumable or customer replaceable unit associated with that warning message or alert icon 240, will also not be able to be completed. Furthermore, if the image forming system 100 is not able to automatically stop or is able to skip a job that cannot be completed to perform a job that can be completed, then none of the jobs after that job will be able to be completed.

In one example of an exemplary embodiment of the user interface 200, shown in FIG. 2, one job could be more urgent to the user than another job. That is, for example, the job corresponding to the job identification portion 230 might have a high priority. If the user were not advised of the problems in completing the job corresponding to the job identification portion 228 until after the problem actually occurred, the user will not be able to complete the job corresponding to the job identification portion 228 without first addressing the problem. If cyan toner is needed to complete the job corresponding to the job identification portion 228, the user might be out of cyan toner and have to reorder. If the job corresponding to the job identification portion 230 also needs cyan toner, the result is that neither of the jobs corresponding to the job identification portions 228 or 230, or any subsequent job that requires cyan toner, can be completed.

In various exemplary embodiments of the systems and methods according to this invention, after a user is notified by a warning message or alert icon 240 that an action needs to be taken in order for the job corresponding to the associated job identification portion to be completeable, the user can reorder the displayed sequence of the job identification portions, and thus reorder the jobs in the job queue. This will allow the user to complete as many jobs as possible before it becomes impossible to avoid the problem associated with the warning message or the alert icon 240. It should be appreciated that one or more warning messages or alert icons 240 can be displayed indicating various problems with the job identification portions.

In various exemplary embodiments of the user interface 200, such as that shown in FIG. 2, the auto button 212, the manual button 214, the promote button 216 and/or the demote button 218 allow the user to reorganize the sequence of job identification portions displayed in the user interface, and thus the order of the corresponding jobs in the job queue. Of course, it should be appreciated that the auto button 212, the manual button 214, the promote button 216 and/or the demote button 218 may each be implemented using a check box or other selection widget, as is well known in the art. In addition, each of the auto button 212, the manual button 214, the promote button 216, and the demote button 218 may be arranged anywhere within the user interface 200, as is well known in the art.

One example of the operation of the exemplary embodiment set forth in FIG. 2, will be described below. In this example, the job corresponding to the job identification portion 230 has a higher priority than the job corresponding to the job identification portion 228. In operation, the warning message or alert icon 240 in the job identification portion 228 can signal to the user that, for example, one of the toner units 152, 154, 156, and 158 needs refilling or replacing in order to complete the job corresponding to the job identification portion 228. Accordingly, the user can prioritize the job identification portions, and thus the jobs to be completed.

For example, the job corresponding to the job identification portion 228 requires 25 sets of 5 originals, or 125 printed sheets. The job corresponding to the job identification portion 230 requires 10 sets of 1 original, or only 10 printed sheets. Thus, the user can activate the promote button 216 to advance the job 230 above the job 228, allowing the job corresponding to the job identification portion 230 to be printed before the job corresponding to the job identification portion 228.

One advantage of promoting one job over another is to allow a higher priority job to be completed before a job deemed by the user to be less important. In addition, if all jobs are of equal importance, then many small jobs rather than one large job can be completed before the refilling or replacement of one of the toner units 152, 154, 156, and 158. This will further increase the use of the toner units 152, 154, 156, and 158 and allow more jobs to be completed and minimizing waste of toner and other material.

According to another exemplary embodiment of the systems and methods of this invention, the control system 400 can prevent any job from being started if any warning message or alert icon 240 associated with the job identification portion corresponding to that job has not yet been satisfactorily addressed. The warning message or alert icon 240 might indicate that the job corresponding to the job identification portion 228 requires more cyan toner than is available to complete that job in the image forming system 100. Thus, warning message or alert icon 240 will indicate inadequate amount of cyan toner.

In order to satisfactorily address this warning message or alert icon 240, the user will have to supply more cyan toner to the image forming system 100. Additionally, the user can respond to the warning message or alert icon 240 by promoting a job corresponding to a job identification portion that requires an amount of cyan toner which is less than or equal to the available amount of cyan toner. However, until the user satisfies the warning message or alert icon 240, the control system 400 will not allow promotion of any job identification portion ahead of the job identification portion 228 if the job corresponding to such a job identification portion that the user wishes to promote would not be completable by the current amount of cyan toner.

However, it should be appreciated that, if the job corresponding to the identification portion 230 is directed to a black and white image, thus requiring no cyan toner, in this exemplary embodiment, the control system 400 will allow the job identification portion 230 to be promoted ahead of the job identification portion 228. As a result, the job corresponding to the job identification portion 230 is moved in the job queue ahead of the job corresponding to the job identification portion 228. Additionally, the user is allowed to promote any other job ahead of the job corresponding to the job identification portion 228 as long as any cyan toner required by the promoted job corresponding to the job identification portion is less than an available unallocated amount. If a problem will exist with the promoted job, the control system 400 will notify the user with another warning message or alert icon 240.

Thus, when a warning message or alert icon 240 appears, the user is able to reorganize the order of any of the job identification portions and thus the corresponding jobs, so long as the new order of the jobs in the job queue is completable in view of any current problems indicated by that and/or any other warning message or alert icon 240.

In various exemplary embodiments, it should be appreciated that the control system 400 can be designed to automatically respond to some warning messages or alert icons without the assistance of a user. If a user does not address the warning message a warning message or alert icon 240 in a given period of time, the control system 400 of the image forming system 100 can automatically promote at least one job which can be completed without causing the same warning message or alert icon to be displayed in the corresponding job identification portion and/or without triggering another warning message or alert icon 240 to expedite completion of the jobs in the job queue. The amount of time for the image forming system 100 to wait before it automatically responds can be set by the user.

Additionally, the user can use the automatic button 212 to request the image forming system 100 to automatically reorder at least one job in response to a warning message or alert icon 240 being displayed without waiting for a given period of time to elapse.

In another exemplary embodiment of the systems and methods according to this invention, one or more job identification portions can be reorganized using the demote button 218. The demote button 218 allows the user to place a job identification portion, such as a job identification portion having a warning message or alert icon, behind other pending job identification portions, thus, moving the job corresponding to the demoted job identification portion behind other jobs in the job queue. Using the demote button 218 can save the time if the user knows the job corresponding to the job identification portion with the alert does not have a high priority. The one job identification portion can be demoted instead of having to promote each of a number of other job identification portions. Thus, the jobs corresponding to the job identification portions having a higher priority get printed and the job corresponding to the job identification portion with alert icon can be addressed at the earliest convenience of the user.

FIG. 3 shows an exemplary embodiment of a graphical representation 300 of the image forming system 100 according to the invention. The graphical representation 300 of the image forming system 100 can be a full screen information page which is displayed when an warning message or alert icon 240 is activated or selected.

The graphical representation 300 includes for example, one or more toner objects 310, 330, 340 and 350 that represent the cyan, magenta, yellow, and black toner supply devices 152–158, respectively, of the image forming system 100. Toner of other colors can be stored in the toner objects 310, 330, 340 and 350 without departing from the spirit and scope of the invention. An object 360 represents the image production device 140.

When an warning message or alert icon 240 indicates that there is a problem, the user can activate the warning message or alert icon 240 by clicking on it with a mouse, touching a touch screen, using voice activation, or any other known or later-developed method for activating or selecting an icon. Any known or later developed method in addition to or instead of the graphical representation 300 can be used to indicate which element of the image forming system 100 is in need of servicing, such as a flashing image over a particular object, an icon with an arrow pointing to a particular object, and the like. In other exemplary embodiments, different representations including text and/or graphics may be used to signify maintenance actions that need to be done on the image forming system 100.

Upon activation or selecting the warning message or alert icon 240, a graphical representation screen, such as that shown in FIG. 3, can be displayed to indicate what problem needs to be addressed. The graphical representation device 300 shows a hatched object, such as the toner object 310, to indicate that that object needs to be serviced. Once the user is aware of this problem, the situation can be taken care of as best seen fit by the user. As discussed above, the user can promote/demote job identification portions or printers.

Other information can be displayed to the user using the graphical representation 300 of the image forming system 100, such as the percentage amount of a particular toner supply that remains available for use or, similarly, how many more pages can be printed on the recording medium before a particular toner runs out. Additionally, the graphical representation 300 of the image forming system 100 can provide directions to the user for fixing the problem. A back button 320 of the graphical representation 300 allows the user to return to the user interface 200 shown in FIG. 2.

Figure 4:
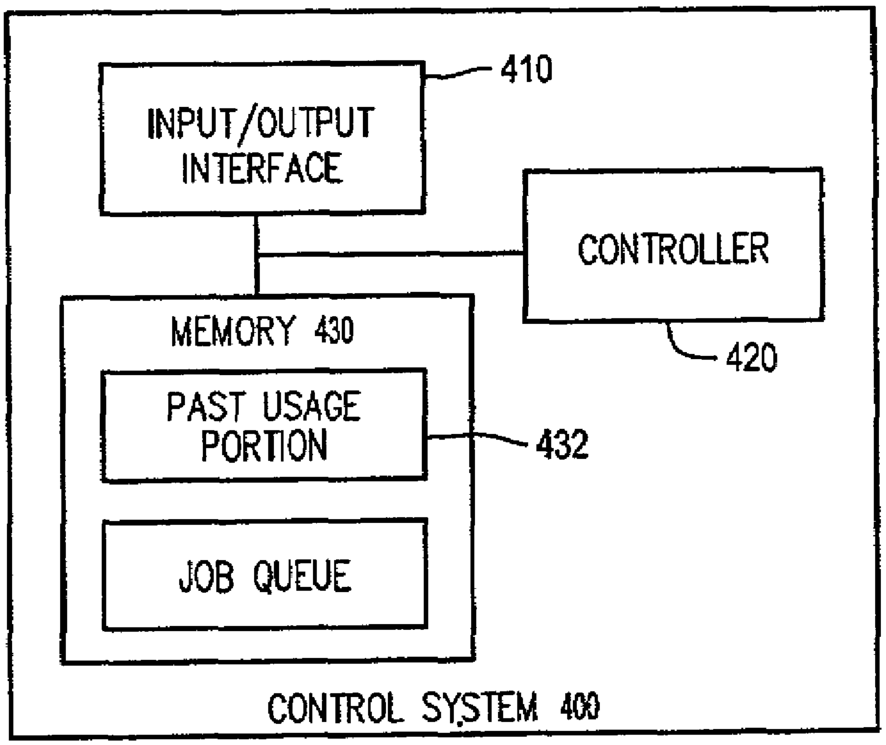
FIG. 4 is a block diagram of the control system of FIG. 1 according to this invention.

FIG. 4 shows one exemplary embodiment of the control system 400 according to this invention. As shown in FIG. 4, the control system 400 includes a input/output interface 410, a controller 420, and a memory 430. The memory 430 may include a past usage memory portion 432 and a job queue portion 434.

The image input device 130 passes a job to the input/output interface 410. The input/output interface 410 passes the job to the controller 420. The controller 420 stores the job in the job queue portion 434 of the memory 430.

The controller 420 determines the amount of one or more customer replaceable materials and/or the amount of useful life of one or more customer replaceable units needed to process the new job. The controller 420 makes these determinations based on sensor signals or the like received from the various devices storing consumables and/or from the various customer replaceable units. Alternatively, the controller 420 can maintain a running count of the use of one such device, such as a particular customer replaceable unit, that indicates for example, the amount of useful life of that customer replaceable unit that has already been consumed. This information is transferred to and stored in the past usage memory portion 432. The past usage memory portion 432 stores the determined one or more material amounts and/or the one or more useful life amounts needed to complete that job, as well as the amounts of one or more consumable materials and/or the remaining amounts of useful life for one or more customer replaceable units, as well as an indication of whether a job can be completed with the remaining unallocated amounts of customer replaceable materials and remaining unallocated amounts of useful life.

The controller 420 controls the image production device 140 to produce images corresponding to a particular job, as is well known in the art. The controller 420 provides a warning that the job corresponding to a particular job identification portion cannot be produced based on the determined amounts of consumable materials and/or amounts of useful life of customer replaceable units for that job relative to the current remaining unallocated amounts. This warning will trigger the display of a warning message or alert icon 240 as discussed above with respect to FIGS. 1–3.

Figure 5:
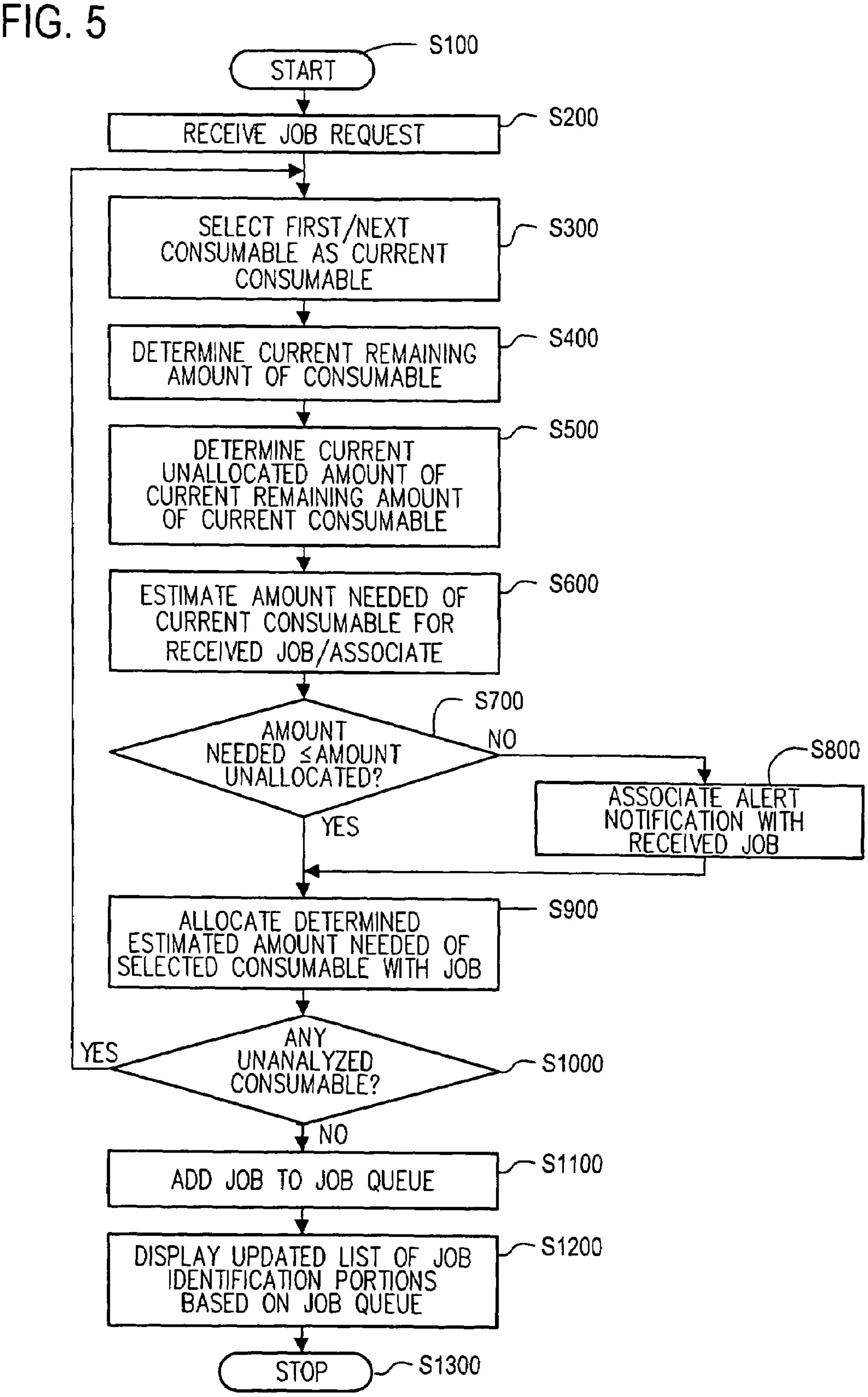
FIG. 5 is a flowchart outlining one exemplary embodiment of a method for determining if a job can be completed according to this invention.

FIG. 5 shows a flowchart outlining one exemplary embodiment of a method for alerting a user concerning low amounts of one or more consumables and/or low amounts of remaining life of one or more customer replaceable units. Operation begins in step S100 and proceeds to step S200 where, a job request is received. In step S300, either a first or a next consumable is selected as the current consumable. It should be appreciated that, in this context, “consumable” includes both replaceable materials that are consumed and customer replaceable units that have useful lifetimes that can be consumed. Next, in step S400, the current total remaining amount of the current consumable is determined. Then, in step S500, the current unallocated amount of the current total remaining amount of the current consumable. The current unallocated amount is that amount of the total remaining amount of the current consumable that has not been previously allocated to jobs that are already in the queue ahead of the received job request and that have not yet been started and/or that have not yet been completed. Operation then continues to step S600.

In step S600, the amount of the current consumable to complete the received job is estimated. Then, in step S700, a determination is made whether the estimated amount needed for the current consumable is less than or equal to the remaining unallocated amount of the current consumable. If the estimated amount of the current consumable needed is more than the remaining unallocated amount of the current consumable, operation continues to step S800. Otherwise, operation jumps directly to step S900. In step S800, an alert notification is associated with the received job request. Operation then continues to step S900.

In step S900, the determined estimated amount needed of the current consumable is allocated to the received job request.

In step S1000, a determination is made whether any consumables remain unanalyzed. If so, operation returns to step S300. Otherwise, operation continues to step S1100, where the received job is added to the job queue. Next, in step S1200, the list of displayed job identification portions is updated to display a job identification portion for the received job request, including any alert notifications associated with the received job request. Operation then continues to step S1300, where the method ends.

Figure 6:
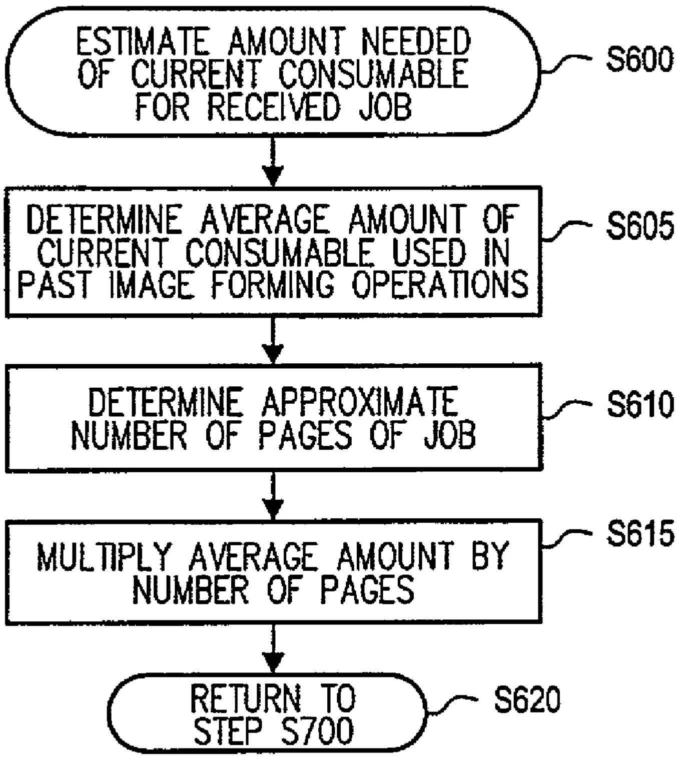
FIG. 6 is a flowchart outlining a first exemplary embodiment of a method for estimating the amount needed of a selected consumable.

FIG. 6 is a flowchart outlining in greater detail a first exemplary embodiment of the method for estimating the amount needed of the current consumable for the received job of step S600. Beginning in step S600, operation continues to step S605, where, an average amount of the current consumable used in past image forming operations is determined. Next, in step S610, the approximate number of pages of the received job request is determined. Then in step S615, the determined average amount is multiplied by the number of pages to determine the amount required for the received job request. Operation then continues to step S620, where operation returns to step S700.

Figure 7:
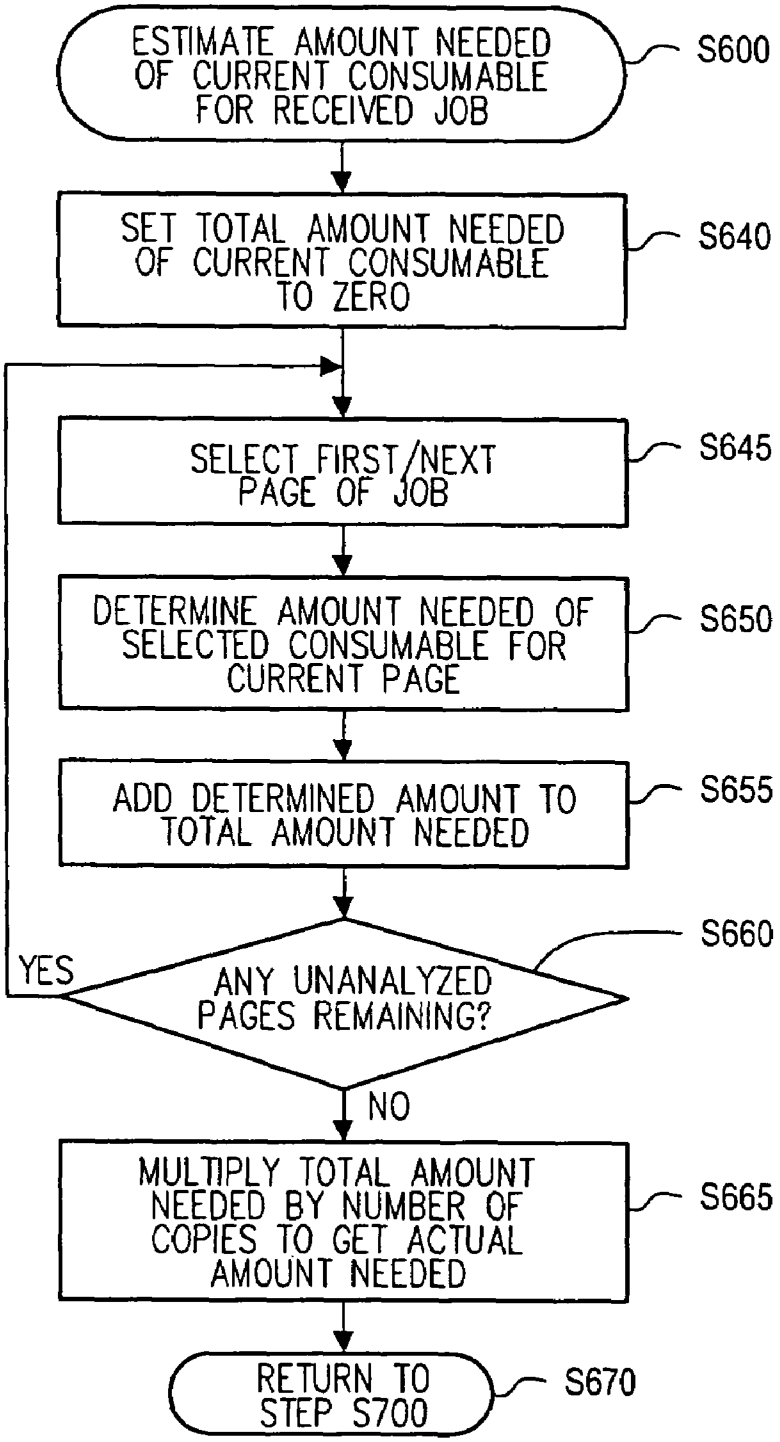
FIG. 7 is a flowchart outlining a second exemplary embodiment of a method for determining the amount needed of a selected consumable.

FIG. 7 is a flowchart outlining in greater detail a second exemplary embodiment of the method for determining the amount of consumable needed for the received job request of step S600. Beginning in step S600, operation continues to step S640, where the total amount needed for the current consumable is set to zero. Then, in step S645, the first/next page of the received job request is selected. Next, in step S650, the amount needed of the current consumable for the selected page is determined. Operation then continues to step S655.

In step S655, the determined amount needed for the selected page is added to the total amount needed. Next, in step S660, a determination is made whether there are any unanalyzed pages remaining. If so, operation returns to step S645. Otherwise, if there are no unanalyzed pages remaining, operation continues to step S665, where the total amount needed is multiplied by the number of copies indicated in the received job request to obtain the actual amount needed. Operation then continues to step S670, where operation returns control to step S700.

Figure 8A:
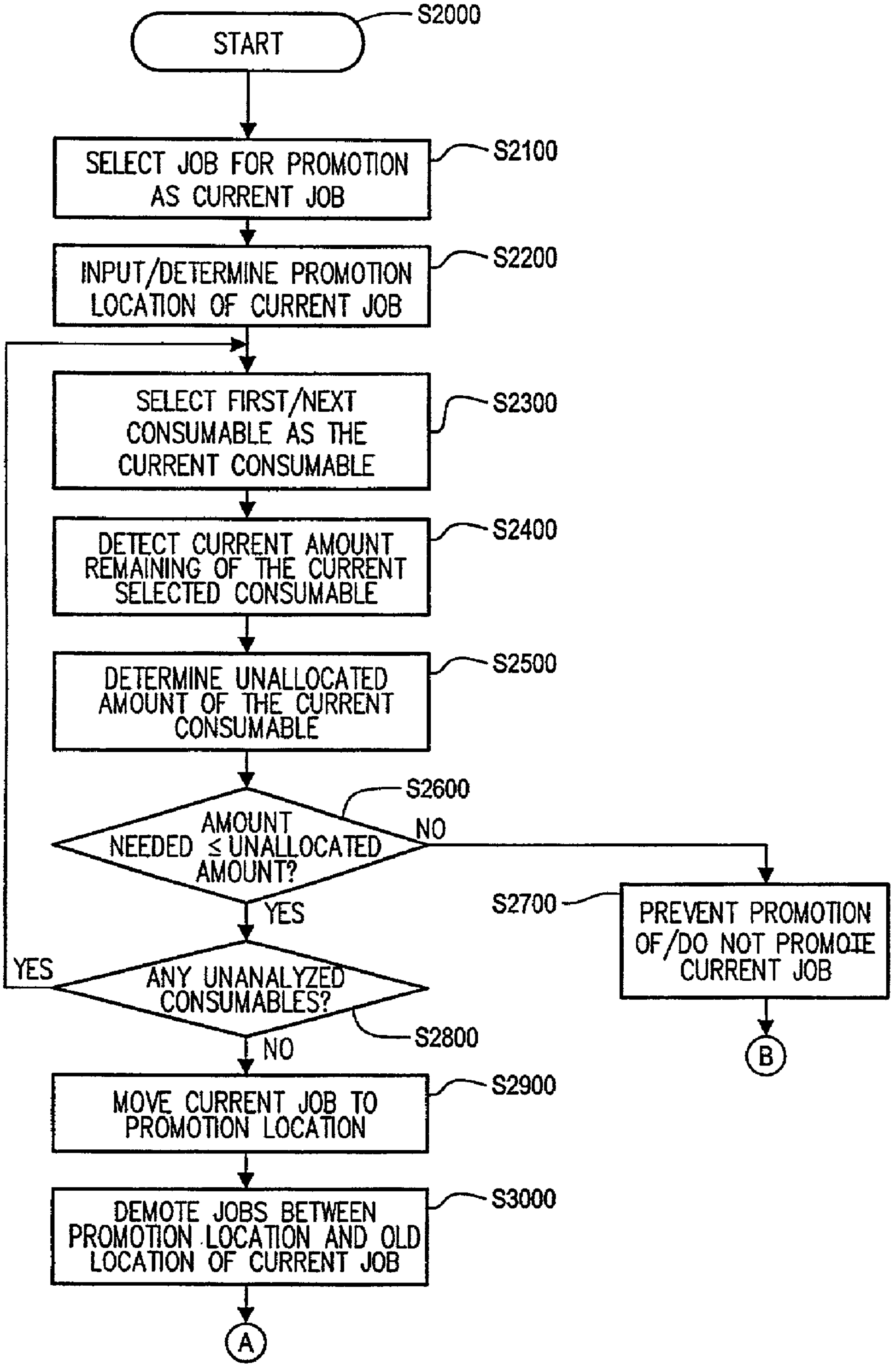
FIGS. 8A and 8B are a flowchart outlining one exemplary embodiment of a method for changing the order of a job in a job queue according to this invention.
Figure 8B:
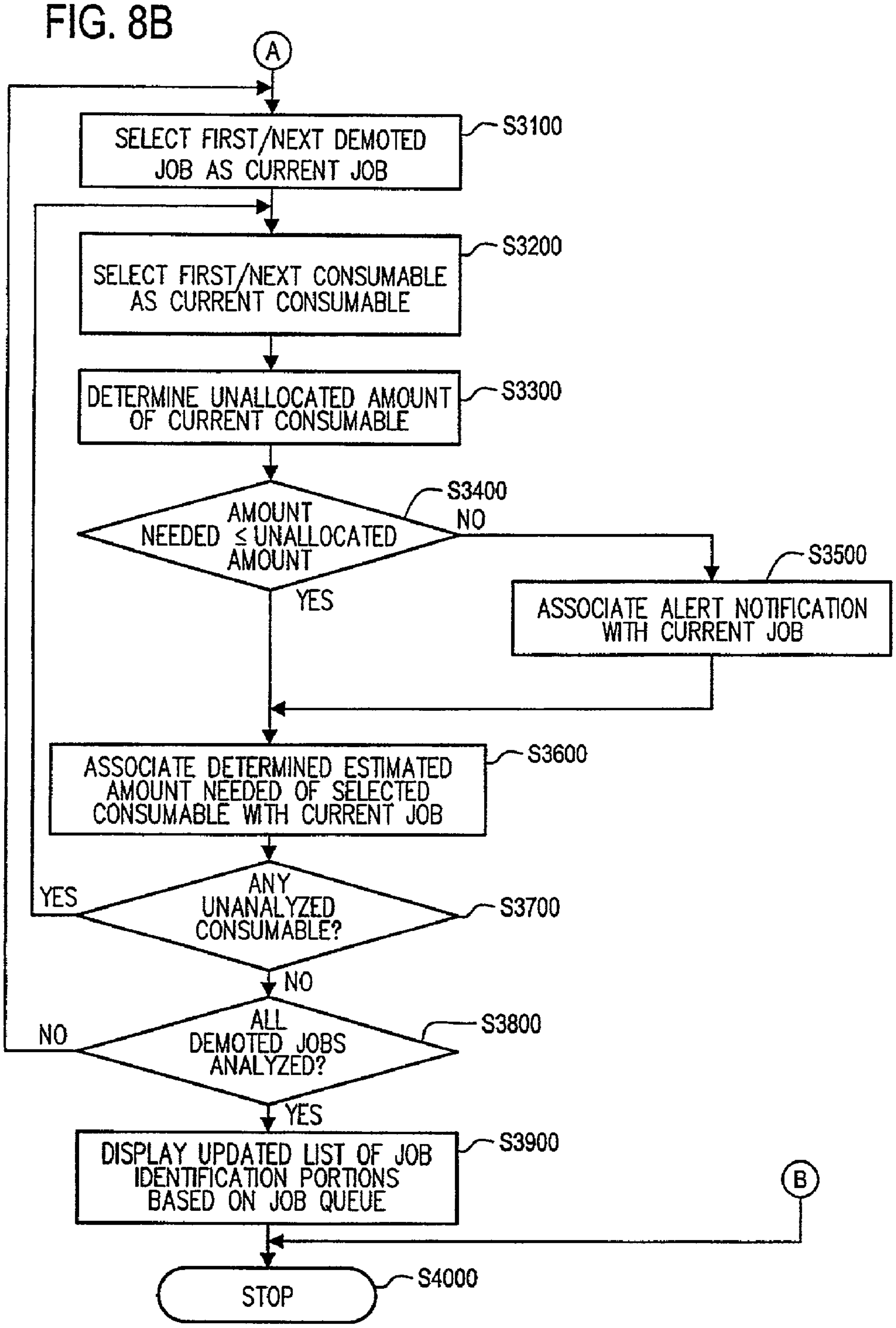

FIGS. 8A and 8B are a flowchart outlining one exemplary embodiment of a method for promoting one job over another job in the job queue. Beginning in step S2000, operation continues to step S2100, where a job selected for promotion is set as the current job. Next, in step S2200, the new location of the current job in the job queue is either automatically determined or an input is received from a user identifying the new location. Then, in step S2300, the first or next consumable is selected as the current consumable. It should be appreciated that, in this context, as above, “consumable” includes both replaceable materials that are consumed and customer replaceable units that have useful lifetimes that can be consumed. Operation then continues to step S2400.

In step S2400, the current total remaining amount of the current consumable is determined. Then, in step S2500, the current unallocated amount of the current total remaining amount of the current consumable is determined. The current unallocated amount is that amount of the total remaining amount of the current consumable that has not been previously allocated to jobs that are already in the queue ahead of the current job and that have not yet been started and/or that have not yet been completed. Next, in step S2600, a determination is made whether the amount needed is less than or equal to the determined unallocated amount. If not, control proceeds to step S2700. Otherwise, if the amount needed is less than or equal to the unallocated amount, control proceeds to step S2800.

In step S2700, the job selected for promotion is prevented from being promoted. Operation then jumps to step S4000. In contrast, in step S2800, a determination is made whether any consumables still remain to be analyzed. If so, operation returns to step S2300. Otherwise, operation proceeds to step S2900, where the current job is moved to the promotion location. The promotion location indicates the jobs in the job queue which are able to be completed given the current amount of consumables. Operation then continues to step S3000.

In step S3000, the jobs located between the promotion location and previous location of the current job are demoted. Next, in step S3100, the first/next demoted job that was demoted in step S3000 is selected as the current job. Then, in step 3200, the first/next consumable is selected as the current consumable. Operation then proceeds to step S3300.

In step S3300, the current unallocated amount of the current total remaining amount of the current consumable is determined. The current unallocated amount is that amount of the total remaining amount of the current consumable that has not been previously allocated to jobs that are already in the queue ahead of the current job and that have not yet been started and/or that have not yet been completed. Then, in step S3400, a determination is made whether the amount needed is less than or equal to the unallocated amount. If not, control proceeds to step S3500. Otherwise, operation jumps to step S3600.

In step S3500, a new alert notification is associated with the current job. Operation then continues to step S3600. In step S3600, the determined estimated amount needed of the selected consumable is associated with current job. Next, in step S3700, a determination is made whether any consumables are unanalyzed for the current job. If so, operation returns to step S3200. Otherwise, operation proceeds to step S3800, where a determination is made whether all of the demoted jobs demoted in step S3000 have been analyzed. If not, operation returns to step S3100. Otherwise, operation proceeds to step S3900, where the list of displayed job identification portions is updated to display the job identification portions in the order corresponding to the new order of the jobs in the job queue, as well as any alert notifications associated with those jobs. Operation then proceeds to step S4000, where operation of the method ends.

The control system 400 is, in various exemplary embodiments, implemented on a programmed general purpose computer. However, the control system 400 can also be implemented on a special purpose computer, a programmed microprocessor or microcontroller and peripheral integrated circuit elements, an ASIC or other integrated circuit, a digital signal processor a hardwired electronic or logic circuit such as a discrete element circuit, a programmable logic device such as a PLD, PLA, FPGA, or PAL, or the like. In general, any device, capable of implementing a finite state machine that is in turn capable of implementing the flowcharts shown in FIGS. 5–8B, can be used to implement the control system 400.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image forming apparatus, comprising:

a memory that stores a queue of jobs to be performed using the image forming apparatus;

at least one element having a useful life consumed by the image forming apparatus or containing material consumed by the image forming apparatus in performing the jobs within the queue of jobs;

at least one sensor that determines for the at least one element of the image forming apparatus, a remaining amount of a consumable associated with that element;

a controller that determines, for each of at least one job that is in the job queue or is to be added to the job queue, and for at least one consumable within the image forming apparatus, if that job can be performed based on an unallocated amount of a remaining amount of that consumable;

a notification device that conveys an alert notification generated by the controller to a user if that job cannot be completed in view of the unallocated amount of that consumable;

a job queue adjustment mechanism that enables reprioritizing of jobs in the job queue by promoting or demoting of a selected job, the job queue adjustment mechanism including:

means for selecting a job from the queue of jobs for reprioritizing;

means for determining a new location in the job queue for the selected job;

means for determining, for the selected job and for at least one consumable within the image forming apparatus, if the selected job can be performed at the new location based on an unallocated amount of the remaining amount of the at least one consumable;

means for preventing promotion of the selected job to the new location if the selected job cannot be performed at the new location based on an unallocated amount of the remaining amount of the at least one consumable;

means for promoting the selected job to the new location, when the new location is a location higher in the job queue, only if the selected job can be performed at the new location based on an unallocated amount of the remaining amount of the at least one consumable;

means for demoting at least one other job to a location lower in the job queue;

means for reevaluating whether demoted jobs in the job queue between an original location of the selected job and the new location can be performed based on an unallocated amount of the remaining amount of the at least one consumable; and means for activating the notification device if any demoted job cannot be performed.

2. The apparatus of claim 1, wherein, for each of the at least one job and for each of the at least one consumable, the controller estimates an amount needed of that consumable for that job.

3. The apparatus of claim 2, wherein for each of the at least one consumable, the controller allocates an estimated amount of that consumable to that job.

4. The apparatus of claim 2, wherein the controller estimates the amount needed of the consumable for that job on a page by page basis.

5. The apparatus of claim 1, wherein the notification device is at least one of an alert icon, alert message, flashing light or audible noise.

6. The apparatus of claim 1, wherein, for each job for which the controller has generated an alert notification, the controller prevents the printing of that job.

7. The apparatus of claim 6, wherein the notification device indicates at least one of a customer replaceable unit that will need replacing to complete the associated job, that a supply of toner will be inadequate to complete the associated job, and a supply of sheets of a recording medium will need replenishing to complete the associated job.

8. A method for operating an image forming apparatus having a queue of jobs to be performed using the image forming apparatus and at least one element having a useful life consumed by the image forming apparatus or containing material consumed by the image forming apparatus in performing the jobs within the queue of jobs, the method comprising:

determining, for at least one of the at least one element of the image forming apparatus, a remaining amount of a consumable associated with that element;

determining, for at least one job that is in the job queue or is to be added to the job queue, and for at least one consumable within the image forming apparatus, if that job can be performed based on an unallocated amount of a remaining amount of that consumable;

generating, for at least one consumable, an alert notification if that job cannot be completed in view of the unallocated amount of that consumable;

conveying the alert notification to a user; and reprioritizing one or more jobs within the job queue by promoting or demoting, the reprioritizing including:

selecting a job from the queue of jobs for reprioritizing;

determining a new location in the job queue for the selected job;

determining, for the selected job and for at least one consumable within the image forming apparatus, if the selected job can be performed at the new location based on an unallocated amount of the remaining amount of the at least one consumable;

preventing promotion of the selected job to the new location if the selected job cannot be performed at the new location based on an unallocated amount of the remaining amount of the at least one consumable;

promoting the selected job to the new location, when the new location is a location higher in the job queue, only if the selected job can be performed at the new location based on an unallocated amount of the remaining amount of the at least one consumable;

demoting at least one other job to a location lower in the job queue;

reevaluating whether demoted jobs in the job queue between an original location of the selected job and the new location can be performed based on an unallocated amount of the remaining amount of the at least one consumable; and activating the notification device if any demoted job cannot be performed.

9. The method of claim 8, further comprising estimating, for each of the at least one job and for each of the at least one consumable, an amount needed of that consumable for that job.

10. The method of claim 9, further comprising allocating, for each of the at least one job and for each of the at least one consumable, the estimated amount of that consumable for that job to that job.

11. The method of claim 9, wherein estimating the amount needed for that job comprises estimating the amount needed of that consumable for that job on a page by page basis.

12. The method of claim 9, wherein estimating the amount needed for that job comprises determining an average amount of that consumable used in past image forming operations.

13. The method of claim 12, wherein determining the average amount of that consumable further comprises:

determining an average amount of that consumable used for a page in past image forming operations.

14. The method of claim 13, wherein estimating the amount needed for that job further comprises:

determining an approximate number of pages of that job; and multiplying the average per page amount by the approximate number of pages of that job.

15. The method of claim 9, wherein estimating the amount needed comprises:

setting a total amount needed of that consumable to zero;

selecting in turn each page of that job;

determining an amount needed of selected consumable for the selected page;

adding the determined amount needed to a total amount needed; and multiplying the total amount needed by a number of copies to obtain the estimated amount needed.

16. The method of claim 8, wherein generating the alert notification further comprises associating the alert notification with that job.

17. The method of claim 8, wherein generating the notification alert comprises generating at least one of an alert icon, an alert message, a flashing light or an audible noise.

18. The method of claim 8, further comprising preventing printing of a job if an alert notification has been associated with that job.

19. A method for operating an image forming apparatus having a queue of jobs to be performed using the image forming apparatus and at least one element having a useful life consumed by the image forming apparatus or containing material consumed by the image forming apparatus in performing the jobs within the queue of jobs, comprising:

(a) selecting a job from the queue of jobs for promotion as a current job;

(b) determining a promotion location for the current job;

(c) determining, for at least one element of the image forming apparatus, a remaining amount of a consumable associated with that element;

(d) determining, for the current job and for the consumable within the image forming apparatus, if the current job can be performed based on an unallocated amount of the remaining amount of that consumable;

(e) preventing promotion of the current job if the current job cannot be performed based on the unallocated amount of the remaining amount of that consumable; and (f) moving the current job to the promotion location of the current job only if the current job can be performed based on the unallocated amount for each of the at least one consumable determined in step (d).

20. The method of claim 19, further comprising demoting at least one other job between the promotion location and an old location of the current job upon moving the current job to the promotion location.

21. The method of claim 20, further comprising:

(g) selecting at least one demoted job as the current job;

(h) determining, for the selected demoted job and for at least one consumable within the image forming apparatus, if the selected demoted job can be performed based on an unallocated amount of the remaining amount of that consumable for the selected demoted job; and (i) conveying an alert notification to a user if the selected demoted job cannot be performed based on the unallocated amount of the remaining amount of that consumable.

22. The method of claim 21, further comprising repeating steps (g)–(i) for each demoted job in turn as the current job until all demoted jobs have been analyzed and determined whether each demoted job can be performed.

* * * * *